(12) United States Patent
Stager (10) Patent No.: US 7,853,750 B2
(45) Date of Patent: Dec. 14, 2010

(54) METHOD AND AN APPARATUS TO STORE DATA PATTERNS

(75) Inventor: Roger Stager, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 976 days.

(21) Appl. No.: 11/700,701

(22) Filed: Jan. 30, 2007

(65) Prior Publication Data

US 2008/0184001 A1 Jul. 31, 2008

(51) Int. Cl.
  *G06F 12/00* (2006.01)
(52) U.S. Cl. .................. 711/112; 711/162; 711/165; 711/167
(58) Field of Classification Search .................. None
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,819,292 A | 10/1998 | Hitz et al. | |
| 5,990,810 A | 11/1999 | Williams | |
| 6,061,770 A | 5/2000 | Franklin | |
| 6,081,875 A | 6/2000 | Clifton et al. | |
| 6,289,451 B1 | 9/2001 | Dice | |
| 6,341,341 B1 | 1/2002 | Grummon et al. | |
| 6,477,544 B1 * | 11/2002 | Bolosky et al. | 707/200 |
| 6,704,730 B2 | 3/2004 | Moulton et al. | |
| 6,810,398 B2 | 10/2004 | Moulton | |
| 6,892,211 B2 | 5/2005 | Hitz et al. | |
| 7,010,553 B2 | 3/2006 | Chen et al. | |
| 7,072,910 B2 | 7/2006 | Kahn et al. | |
| 7,079,053 B2 | 7/2006 | Kolavi | |
| 7,124,305 B2 | 10/2006 | Margolus et al. | |
| 7,127,577 B2 | 10/2006 | Koning et al. | |
| 7,289,643 B2 | 10/2007 | Brunk et al. | |
| 7,289,886 B1 | 10/2007 | Woytowitz | |
| 7,333,993 B2 | 2/2008 | Fair | |
| 2002/0194529 A1 | 12/2002 | Doucette et al. | |
| 2004/0030668 A1 | 2/2004 | Pawlowski et al. | |
| 2004/0083245 A1 | 4/2004 | Beeler, Jr. | |
| 2005/0071436 A1 | 3/2005 | Hsu et al. | |
| 2007/0255758 A1 | 11/2007 | Zheng et al. | |

OTHER PUBLICATIONS

Glasshouse, Technical Paper—Network Appliance NearStore VTL. pp. 1-6. Copyright 2006 GlassHouse Technologies, Inc.

Dianne McAdam, "Evaluating Virtual Tape Systems—They Are Not All the Same". Data Mobility Group, Dec. 21, 2005. pp. 1-10.

(Continued)

*Primary Examiner*—Reginald G Bragdon
*Assistant Examiner*—Baboucarr Faal
(74) *Attorney, Agent, or Firm*—Cesari and McKenna, LLP (57) ABSTRACT

A method and an apparatus to store data patterns are presented. In one embodiment, the method includes searching a pattern repository to find prior copies of a pattern and to reference one of the prior copies, or insert a new copy, based on the access time of the prior copy and the effect on the sequential stream performance.

17 Claims, 6 Drawing Sheets

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Bilenko, Mikhail et al., "Adaptive Duplicate Detection Using Learnable String Similarity Measures". Published in Proceedings of the Ninth ACM SIGKDD International Conference on Knowledge, Aug. 23, 2003, pp. 1-10.

Bitton, Dina, Disk Shadowing, Proceedings of the 14.sup.th VLDB Conference, LA, CA (1988), 8 pages.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992, 18 pages.

Coyne, Robert A., et al., Storage Systems for National Information Assets, Proc. Supercomputing 92, Minneapolis, Nov. 1992, pp. 626-633.

Crochemore, Maxime et al., "Pattern Matching and Text Compression Algorithms", dated Jan. 8, 2003, retrieved from http://citeseer.comp.nus.edu.sg/595025.html, 50 pages.

Finlayson, Ross S., et al., Log Files: An Extended File Service Exploiting Write-Once Storage Department of Computer Science, Stanford University, Report No. STAN-CS-87/1177, Sep. 1987, 14 pages.

Gray, Jim, et al., The Recovery Manager of the System R Database Manager, ACM Computing Surveys, (13)2:223-242 1981, 20 pages.

Hecht, Matthew S., et al. Shadowed Management of Free Disk Pages with a Linked List, ACM Transactions on Database Systems, 8/4, Dec. 1983, pp. 503-514.

Howard, John H, et al., Scale and Performance in a Distributed File System, Carnegie Mellon University, CMU-ITC-87-068, Aug. 5, 1987, 33 pages.

Howard, John H., An Overview of the Andrew File System, Carnegie Mellon University, CMU-ITC-88-062 1988, 6 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A, Physical Integrity in a large segmented database, ACM Trans. Database Systems, 2(1): 91-104, Mar. 1977.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Reichenberger, Christoph, "Delta Storage for Arbitrary Non-Text Files", ACM Press, Proceedings of the 3rd International Workshop on Software Configuration Management, Jun. 12-14, 1991, pp. 144-152.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

Zheng, Ling, et al., U.S. Appl. No. 11/105,895, entitled Method and Apparatus for Identifying and Eliminating Duplicate Data Blocks and Sharing Data Blocks in a Storage System, Apr. 13, 2005, 46 pages.

Notification of Transmittal of The International Search Report and The Written Opinion of the International Searching Authority and Declaration, Network Appliance, Inc., International Application No. PCT/US07/014664, International Filing Date: Jun. 25, 2007, Date of Document Mailing: Apr. 9, 2008, 12 pages.

Notification of Transmittal of The International Search Report and the Written Opinion of the International Searching Authority, or the Declaration, Network Appliance, Inc., International Application No. PCT/US07/010222, International Filing Date: Apr. 26, 2007, Date of Document Mailing: Apr. 15, 2008, 15 pages.

FIPS Pub 198, "The Keyed-Hash Message Authentication Code (HMAC)", published by National Institute of Standards and Technology, Mar. 6, 2002, 20 pages.

Quinlan, Sean, et al., "Venti: A New Approach to Archival Storage," Proceedings of Fast. Conference on Life and Storage Technologies, XX, XX, XP-002385754, Jan. 28, 2002, pp. 1-13.

You, Lawrence L., et al., "Deep Store: An Archival Storage System Architecture," Data Engineering, 2005.Proceedings. 21[St] International Conference on Tokyo, Japan Apr. 5-8, 2005, Piscataway, NJ, USA, IEEE, XP-010788230, Apr. 5, 2005, pp. 804-815.

"Notification of Transmittal of the International Search Report and the Written Opinion of the International Searching Authority, or the Declaration," International Filing Date: Jan. 24, 2008, International Application No. PCT/US2008/000900, Applicant: Network Appliance, Inc., Date of Mailing: Oct. 30, 2008, pp. 1-15.

\* cited by examiner

METHOD AND AN APPARATUS TO STORE DATA PATTERNS

TECHNICAL FIELD

The present invention relates to networked storage systems, and more particularly, to storing data patterns.

BACKGROUND

A networked storage system may include a number of storage appliances. A storage appliance may provide services related to the organization of data on mass storage devices, such as disks (e.g., magnetic disks, optical disks). Certain types of storage appliances are commonly referred to as filers or file servers. An example of such a storage appliance is any of the products made by Network Appliance, Inc. in Sunnyvale, Calif. A storage appliance may be implemented with a special-purpose computer or a general-purpose computer programmed in a particular way. Depending on the application, various networked storage systems may include different numbers of storage appliances.

To mitigate the impact of loss of data in the event of a disaster, data is routinely backed up periodically. Conventionally, data is backed up to tapes by storing a copy of the data on tape. A server that runs a backup application to perform data backup (hereinafter, a "backup server") receives data from a number of clients periodically and stores a copy of the data on tape.

However, tape drives are streaming devices that cannot be simultaneously shared by two servers without additional software, which makes the storage system more complex and expensive. For example, software may be implemented in some conventional system to multiplex or interleave multiple incoming data streams from multiple clients.

Another type of data storage devices, disks (e.g., optical disks, magnetic disks, etc.), typically allows simultaneous access by multiple servers. Moreover, disks generally are more reliable than tapes, because media failure in disks may be reduced by adopting a redundancy scheme, such as Redundant Array of Independent Disks (RAID). However, many organizations today have already invested significant resources into tape-based data backup systems. It would be costly to completely replace these tape-based data backup systems with disk-based systems. As a result, disk-based data backup systems compatible with conventional tapes are developed to accommodate organizations that prefer to retain their existing tapes. A disk-based data backup system that appears like a tape library to a backup application is referred to as a virtual tape library (VTL). An example of a VTL is the NetApp® Nearstore® VTL provided by Network Appliance, Inc. in Sunnyvale, Calif.

Currently, a VTL may be communicably coupled to a number of disks, which may be arranged in volumes. To backup data, the VTL assigns backup data to the disks. Furthermore, to better utilize the storage capacity of the disks, the VTL may compress the data. To compress the data, the VTL may store portions of the data and some information about the data, which is typically called "metadata," instead of storing the entirety of the data, in order to reduce the storage used. For instance, one conventional way to compress data is by eliminating redundant data. If the VTL has already stored a prior version of the data in a disk, the VTL may store the differences between a current version of the data and a prior version of the data instead of storing a copy of the entire current version of the data.

However, versioning may not take into account access latency of the storage devices on which the data is stored. In general, access latency refers to the time it takes to access data in a storage device. Due to the poor access latency of disks, backing up data by versioning alone may lead to poor performance in restoring the backup data.

SUMMARY

The present invention includes a method and an apparatus to store data that may achieve compression and maintain sequential stream performance. In one embodiment, the method includes searching a pattern repository to find prior copies of a pattern and to reference one of the prior copies, or insert a new copy, based on the access time of the prior copy and the effect on the sequential stream performance. A pattern is a portion of a data stream that may repeat itself in the data stream. In some embodiments, a pattern may include a combination of different types of data, such as a bit stream, file names, object references (e.g., pointers), etc.

Other features of the present invention will be apparent from the accompanying drawings and from the detailed description that follows.

DESCRIPTION OF THE DRAWINGS

The present invention is illustrated by way of example and not limitation in the Figures of the accompanying drawings, in which like references indicate similar elements and in which.

DETAILED DESCRIPTION

A method and an apparatus to store data patterns are described. In the following description, numerous specific details are set forth. However, it is understood that embodiments of the invention may be practiced without these specific details. In other instances, well-known components, structures, and techniques have not been shown in detail in order not to obscure the understanding of this description.

Figure 1:
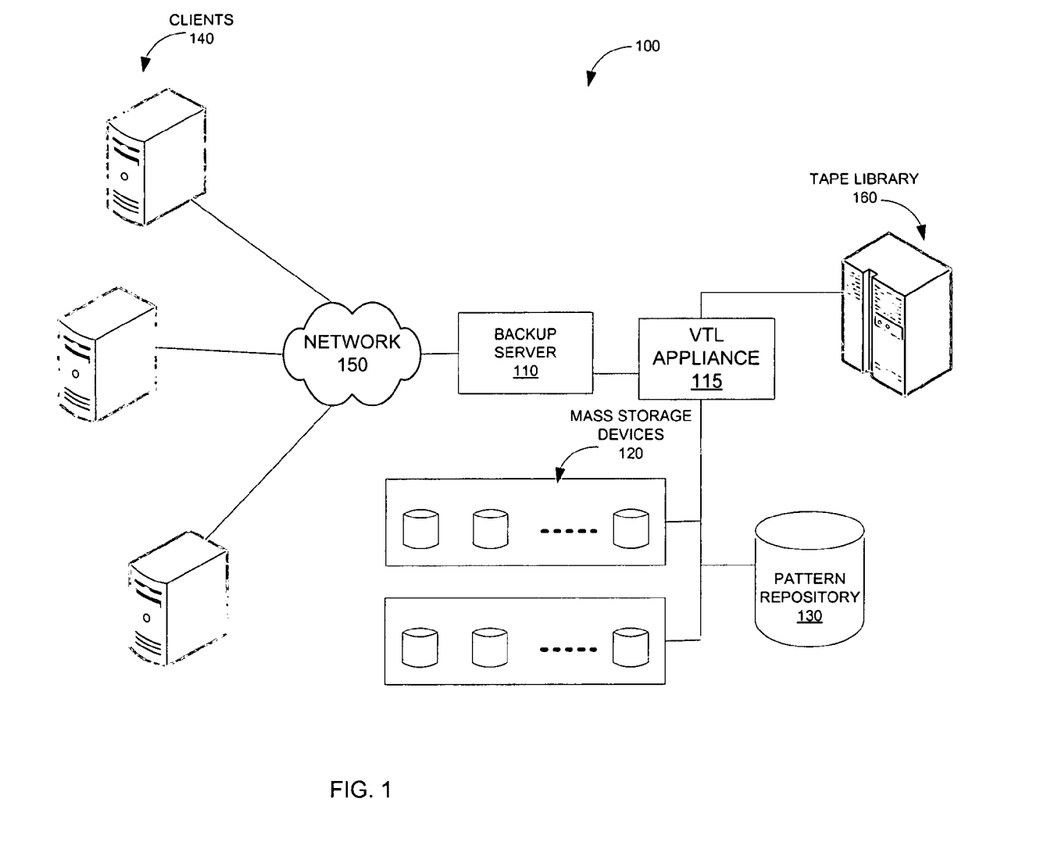
FIG. 1 illustrates an exemplary embodiment of a networked storage system.

FIG. 1 shows a networked storage system 100 usable with some embodiments of the present invention. The system 100 includes a backup server 110, a virtual tape library (VTL) appliance 115 coupled to the backup server 110, a storage facility that includes a set of mass storage devices 120 (e.g., optical disks, magnetic disks, etc.) coupled to the VTL appliance 115, a pattern repository 130 coupled to the VTL appliance 115, a number of clients 140 coupled to the backup server 110 via a network 150, and a tape library 160 coupled to the VTL appliance 115. The mass storage devices 120 may be logically organized in volumes. The volumes may include one or more Redundant Array of Independent Disks (RAID) volumes. Furthermore, the pattern repository 130 may also be implemented on a mass storage device, such as a disk. The network 150 may include a wide area network (WAN), such as the Internet, a local area network (LAN), etc. The clients 140 may be further coupled to additional storage devices (not shown) and are operable to store and update data in the additional storage devices.

In some embodiments, the pattern repository 130 includes a mass storage device, such as a disk, to store patterns. A pattern is a portion of a data stream that may repeat itself in the data stream. Furthermore, a pattern may include a combination of different types of data, such as a bit stream, file names, object references (e.g., pointers), etc.

The clients 140 in the systems may include storage servers, which are further coupled to additional mass storage devices (not shown). The clients 140 manage and organize data on these additional mass storage devices. For example, the clients 140 may read and/or write data to these additional mass storage devices. To protect data from being lost in the event of a disaster, the clients 140 may periodically send the data to the backup server 110 to be backed up in the tape library 160, the mass storage devices 120, and/or the pattern repository 130. For instance, data may be backed up weekly, monthly, etc. In order to store data in the storage devices 120 and the pattern repository 130 and/or the tape library 160, the backup server 110 sends the data to the VTL appliance 115. In one embodiment, the VTL appliance 115 runs a software module commonly referred to as a virtual tape library (VTL) to store data on the mass storage devices 120 and the pattern repository 130 as well as the tape library 160. In general, the VTL implements a disk-based data backup system that appears to be a tape library (like the real tape library 160) to the backup server 110. More details of the VTL appliance 115 and the VTL are discussed below with reference to FIGS. 2 and 3.

In one embodiment, data is stored and transferred in units of files in the system 100. Therefore, the system 100 may be a file-based networked storage system. In one embodiment, the system 100 is a network-attached storage (NAS) system that provides clients 140 with access to data at the file level. The NAS system uses file access protocols to retrieve data, such as, for example, Network File System (NFS), or Common Internet File System (CIFS). The files are logically arranged into directories. A volume of storage devices may be mapped to one or more directories. Alternatively, the system 100 may include or be part of a storage area network (SAN), to provide clients 140 with access to data at the block level of the backup server 110. A block is the basic unit of data used to store data in the SAN or in a NAS configuration.

Note that any or all of the components of system 100 and associated hardware may be used in various embodiments of the present invention. However, it can be appreciated that other configurations of the networked data storage system may include more or fewer devices discussed above.

Figure 2:
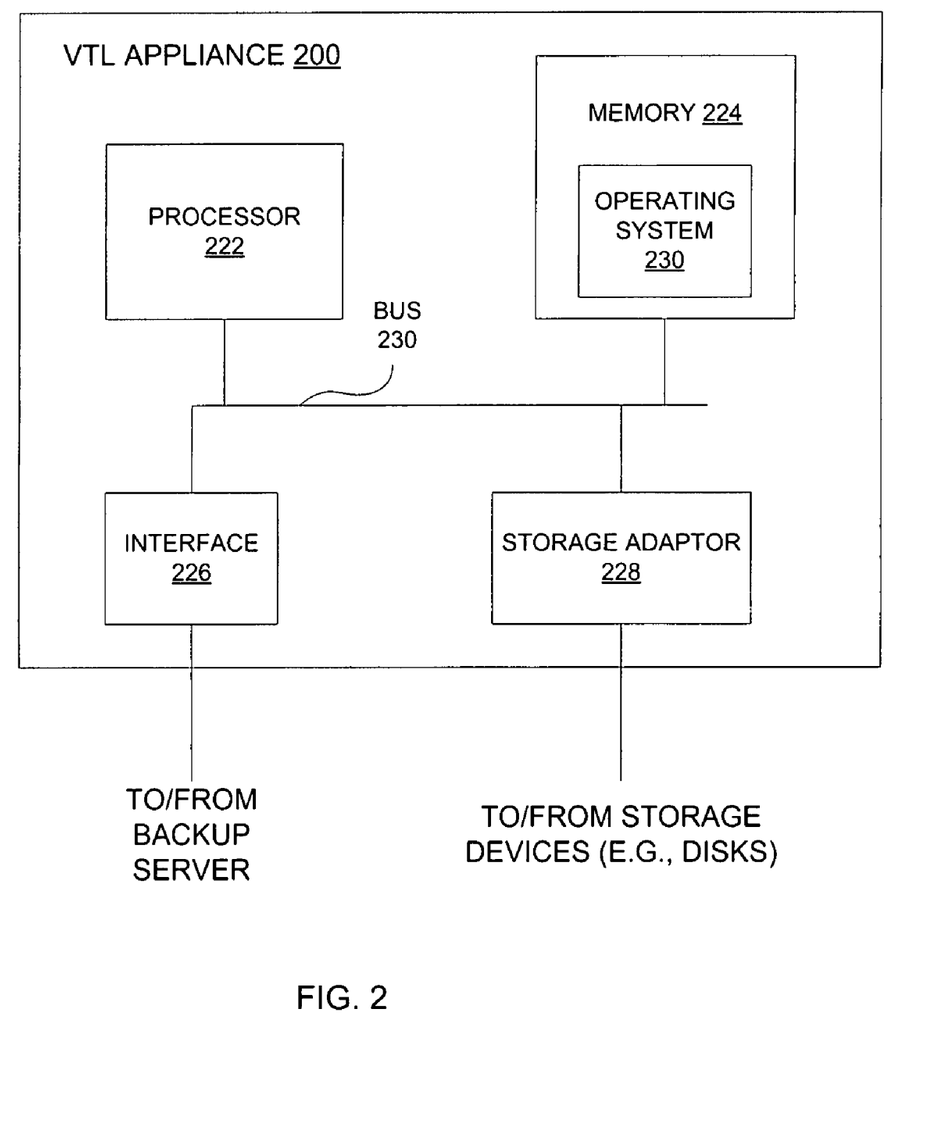
FIG. 2 illustrates one embodiment of a VTL appliance.

One embodiment of a processing system usable to implement the VTL appliance 115 is illustrated in FIG. 2. Referring to FIG. 2, the VTL appliance 200 includes a processor 222, a memory 224, an interface 226, and a storage adapter 228, which are coupled to each other via a bus system 230. The bus system 230 may include one or more buses, adapters, and/or interconnects. In one embodiment, the backup server 200 communicates with a backup server (e.g., an intranet) via the interface 226, which may include an Ethernet adapter, a fiber channel adapter, etc.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of an operating system 230. The processor 222 may retrieve the instructions from the memory 224 to run the operating system 230. The VTL appliance 200 interfaces with the storage devices (e.g., the storage devices 120 and the pattern repository 130) via the storage adapter 228, which can be a Small Computer System Interface (SCSI) adaptor, Fibre Channel adaptor, etc.

Figure 3:
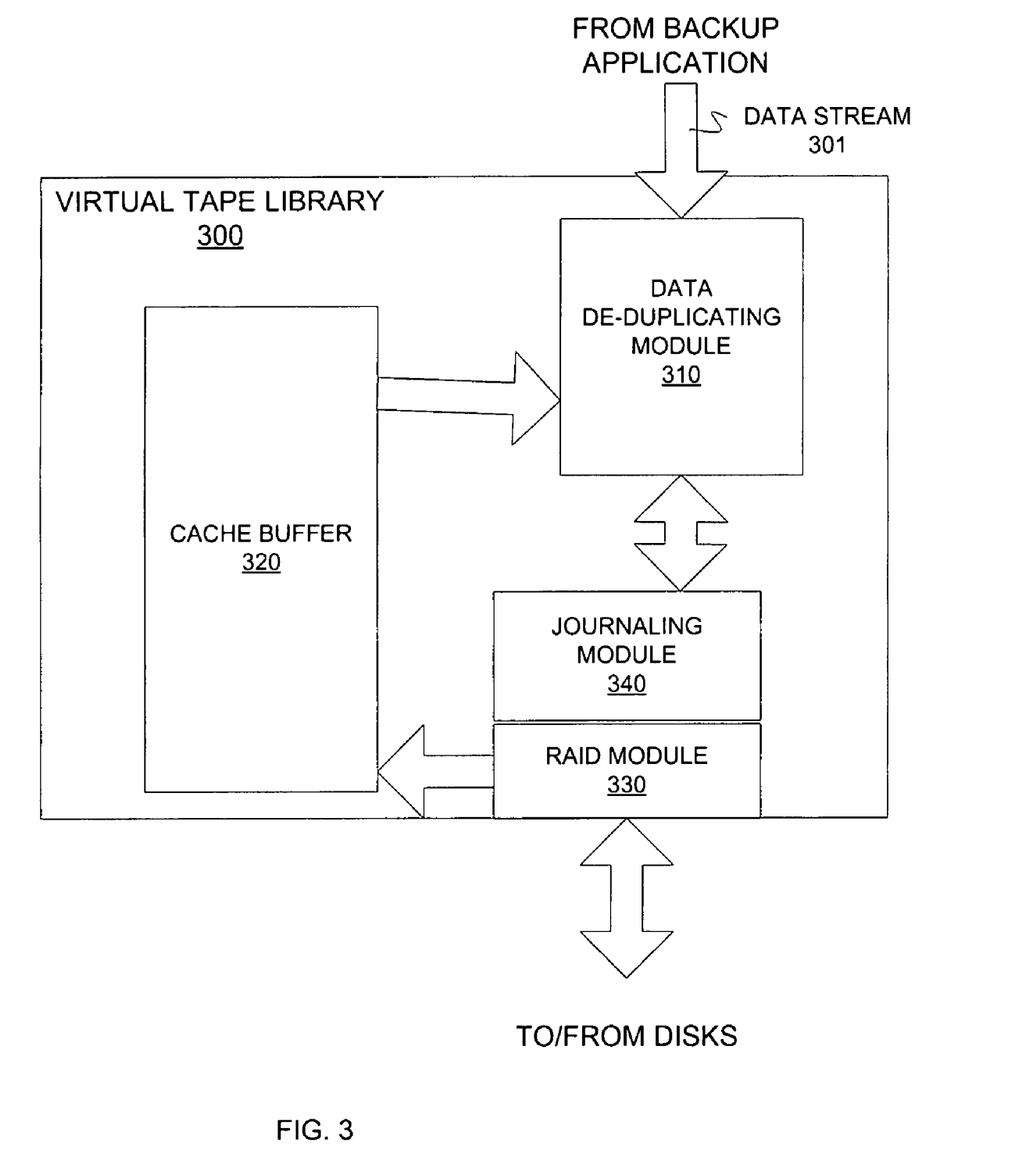
FIG. 3 illustrates a functional diagram of one embodiment of a VTL.

FIG. 3 illustrates a functional diagram of one embodiment of a VTL 300. Note that the components of the VTL illustrated in FIG. 3 are implemented with software, hardware, or a combination of both. The VTL 300 includes a data de-duplicating module 310, a cache buffer 320, a Redundant Array of Independent (or Inexpensive) Disks (RAID) module 330, and a journaling module 340, such as a Journal Object Store (JOS) module. The data de-duplicating module 310 may store incoming data stream 301 by storing patterns of the incoming data stream 301 in a pattern repository (e.g., the pattern repository 130 in FIG. 1) based on an access time of the patterns from the pattern repository. As described above, a pattern is a portion of the data stream 301 that may repeat itself in the data stream 301. In some embodiments, a pattern may include a combination of different types of data, such as a bit stream, file names, object references (e.g., pointers), etc. Since some of the patterns may repeat themselves in the data stream 301, the data de-duplicating module 310 may store a single copy of a pattern in the pattern repository and pointers to refer to the copy in order to reduce the size of data stored. However, the data de-duplicating module 310 may store more than one copy of the pattern in the pattern repository based on access time of the copies of the pattern from the pattern repository. As such, the data de-duplicating module 310 is operable to balance access time of the patterns and storage efficiency by reducing duplicate data stored by the VTL 300. More details of some of the operations performed by the data de-duplicating module 310 are discussed below. The RAID module 330 may implement different levels of RAID, such as RAID-5, RAID-4, etc. The RAID module 330 sends and receives data to/from a number of disks (e.g., the mass storage devices 120 in FIG. 1) and a pattern repository (e.g., the pattern repository 130 in FIG. 1). The pattern repository may be implemented on one or more disks as well. The journaling module 340 may maintain a log, also referred to as a journal, of transactions of data that have taken place so that in the event of a system failure, the data may be recovered easily. The cache buffer 320 may include one or more RAM devices. Some embodiments of the operations of the VTL 300 are described below.

The data de-duplicating module 310 receives a data stream 301 from a client via a backup application running on a backup server, such as the backup server 110 in FIG. 1. The data stream 301 is a stream of information represented by electronic signals in some predefined units or formats, such as bits, bytes, etc. Generally, the data de-duplicating module 310 backs up the data stream 301 to protect the data contained within the data stream 301 from being lost in a disaster by storing portions of the data stream 301 and/or some metadata on the data stream 301, such as a pointer referencing a pattern in the data stream 301. Since only portions of the data stream 301 are stored, the amount of data stored to backup the data stream 301 is less than the amount of data in the original data stream 301. Therefore, the data stream 301 is compressed when the data de-duplicating module 310 backs up the data stream 301 because redundant data patterns are not duplicated. More details of some embodiments of the way the data de-duplicating module 310 backs up the data stream 301 are described below.

Some portions of the data stream 301 may repeat themselves in the data stream 301. For example, a client may use the backup server running the VTL 300 to backup email messages in an email account. The data stream 301 in this example may contain an email message received and an email message forwarding the received email message. Note that the forwarding email message includes another copy of the received email message. Therefore, the portion of the data stream 301 representing the received email message may be considered as a pattern, which repeats itself in the forwarding email message. In one embodiment, the data de-duplicating module 310 takes advantage of the fact that the data stream 301 typically contains a number of repeating patterns. To back up the data stream 301, the data de-duplicating module 310 stores a copy of a pattern in the pattern repository and stores pointers to the copy when the pattern repeats itself in the data stream 301 instead of storing another copy of the pattern in the pattern repository. Furthermore, the pointers may be stored in the same order as the order in which the patterns appear in the data stream 301. In other words, the data de-duplicating module 310 compresses the data stream 301 when backing up the data stream 301. The backed up copy of the data stream 301 includes patterns of the data stream 301 stored in the pattern repository and pointers stored in another disk to reference the patterns in the pattern repository. The data stream 301 is compressed because the backed up copy of the data stream 301 is of a smaller size than the data stream 301. The technique described above reduces the storage capacity used to store backup data because only portions of the data stream 301 are stored instead of a copy of the entire data stream 301. Because the technique described above stores a single instance of each pattern, this technique may be referred to as a Single Instance Store. As explained above, one advantage of Single Instance Store is to improve the efficiency in storing data as the data stream 301 is compressed when the data de-duplicating module 310 stores the data stream 301.

To retrieve the data stream 301 from the backed up data in response to a request (such as in response to a restore command), the data de-duplicating module 310 may access the pointers sequentially in the same order the pointers have been stored and use the stored pointers to retrieve the corresponding patterns from the pattern repository in the same order. The retrieved patterns are temporarily held in the cache buffer 320. The data de-duplicating module 310 then assembles the patterns into a data stream identical to the data stream 301. To assemble the patterns, the data de-duplicating module 310 may concatenate the patterns in the same order as the order in which the corresponding referencing pointers have been stored. Since the amount of data in the assembled data stream is larger than the amount of data in the backed up version of the data stream 301, the above process to regenerate the data stream 301 may be referred to as "decompression."

It should be appreciated that patterns typically appear in a random order in the data stream 301, and thus, the above technique randomizes access to the patterns in the pattern repository during compression and/or decompression. When the pattern repository is stored in RAM, this randomization has minimal impact on speed. However, when the size of the pattern repository has grown beyond the capacity of RAM, the data may be stored on media with larger capacity, such as disks. But disks typically have poorer access latency than RAM, and thus, the impact on speed is more significant for disks and may render this compression and decompression technique as applied to disks unsuitable for some applications.

To address the problem of poor access latency in disks, therefore, access time of patterns is evaluated when implementing the pattern repository on a disk. In some embodiments, multiple copies of a pattern are stored in the pattern repository and the access time of the pattern is taken into account when selecting which previous occurrence of the pattern in the pattern repository to reference. For example, the access time may be evaluated in terms of a pattern's locality with other patterns in the data stream 301 and locations of the copies of the pattern in the pattern repository since the access time is related to locations of patterns in the pattern repository. One example to illustrate this concept is described in detail below with reference to FIG. 4. By weighting the storage efficiency benefit of accessing a previously stored copy of a pattern against the performance cost of accessing that copy, a balance may be achieved between the efficiency of storage and the performance of compression and decompression. Because multiple copies of a pattern may be stored, this technique may be referred to as Multiple Instance Store. One advantage of Multiple Instance Store is improved performance of compression and decompression of data. Unlike Single Instance Store described above, there may be many occurrences of a pattern in Multiple Instance Store; however, the performance of Multiple Instance Store may allow better sequential access performance in disk.

In some embodiments, a compression ratio of the data stream 301 may be used as a measure of how efficient the compression is in Multiple Instance Store. The compression ratio of the data stream 301 is the ratio of the amount of data in the compressed data stream 301 to the amount of data in the original data stream 301. In some embodiments, a predetermined compression ratio may be set as a threshold in Multiple Instance Store based on the extent of data compression a user desires. For example, the data de-duplicating module 310 calculates a compression ratio that would result from storing an additional copy of a pattern before storing the additional copy of the pattern. If the compression ratio calculated falls below the predetermined compression ratio, then the data de-duplicating module 310 does not store the additional copy regardless of the access time of a previous copy of the pattern in the pattern repository. Otherwise, the data de-duplicating module 310 may evaluate the access time of the previously stored copy of the pattern to decide whether to store the additional copy of the pattern. In some embodiments, more reduction in access time may be required to justify a higher compression ratio.

In some embodiments, a disk on which the pattern repository is implemented is divided into multiple segments and a cache mechanism is used for access. To access the pattern repository, the data de-duplicating module 310 may read an entire segment into the cache buffer 320 and subsequent accesses to the segment will be from the cache buffer 320. Note that the access time to each segment from the pattern repository is significant but that once the segment has been read into the cache buffer 320, then subsequent patterns from that segment can be accessed with minimal latency. This implementation may allow a number of active RAM cache buffers during compression and/or decompression. To back up a portion of the data stream 301 containing a number of patterns, the data de-duplicating module 310 searches the pattern repository for copies of the patterns. For example, hashing algorithms, or any type of methodologies to identify patterns, may be used to identify the multiple copies of the patterns in the pattern repository. Furthermore, the access time of the copies may be calculated in terms of the patterns' location with respect to other patterns of the data stream 301 in the pattern repository. Then the segment from which the most copies of the patterns can be accessed in the least amount of time is selected. Every segment in the pattern repository may be searched for every pattern in order to optimize the compression. However, to reduce resources used in searching (e.g., computing power, computing time, etc.), the data de-duplicating module 310 may limit the search to a predetermined number of segments in the pattern repository. In some embodiments, a minimum threshold for compression efficiency may be set. If the number of pattern matches within a segment falls below the threshold, then a new segment may be created instead of referencing a previous segment. In the newly created segment, a copy of the pattern as well as additional copies of other patterns in the data stream 301 may be stored.

Furthermore, the data de-duplicating module 310 may perform the operations to back up the data stream 301 on the fly (also referred to as real-time processing or inline processing) or in a post-processing fashion. For real-time processing, the data de-duplicating module 310 performs the above operations to back up the data stream 301 as the data stream 301 arrives at the VTL 300. For post-processing backup, the data de-duplicating module 310 stores the incoming data stream 301 in a storage device (e.g., a disk coupled to the VTL 300). The data de-duplicating module 310 reads back the data stream 301 from the storage device later to perform the operations described above to back up the data stream 301.

In one embodiment, the RAID module 330 supports redundancy in the disks. The disks are organized as one or more groups of RAID. When one of the disks experiences a media failure, the RAID module 330 may replace the failing disk with another disk from a group of spare disks (also referred to as redundant disks). The data on the failing disk may be copied to the spare disk used to replace the failing disk. In some instances, the redundancy concept may be further extended to designating a number of segments in a disk as redundant segments and segments having media failure may be replaced with one of the redundant segments.

In addition to the RAID module 330, the VTL 300 includes the JOS module 340 to further improve the reliability of the VTL 300. The JOS module 340 is used to write data to the disks in a self-describing format so that in the event of a system failure, the data may be recovered easily.

Figure 4:
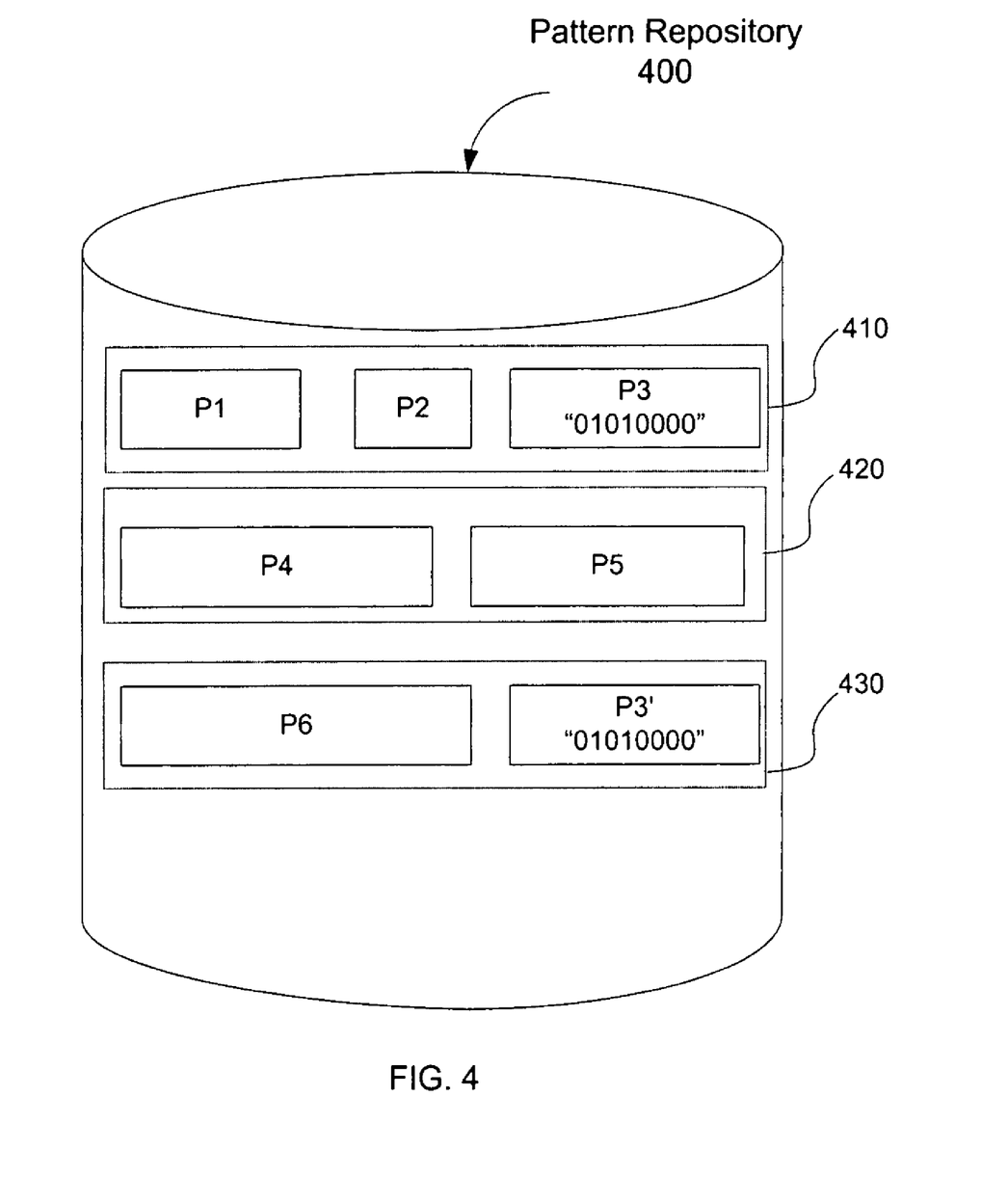
FIG. 4 illustrates one embodiment of a pattern repository.

FIG. 4 illustrates one embodiment of a pattern repository. The pattern repository 400 is divided into a number of segments 410-430, each storing one or more patterns, such as P1, P2, P3, P3', etc. Note that the patterns are stored in the pattern repository 400 sequentially to fill up the segments 410-430 one by one. As described above, a pattern is a portion of a data stream that may repeat itself in the data stream. In some embodiments, a pattern may include a combination of different types of data, such as a bit stream, file names, object references (e.g., pointers), etc. For example, the pattern P3 may be a bit stream of "01010000."

Patterns in a data stream received by a VTL (e.g., the VTL 300 in FIG. 3) are stored one by one in the pattern repository 400. For example, a data stream contains a number of patterns P1-P6 in the following order: P1, P2, P3, P4, P5, P6, P3, where P3 repeats itself at the end of the data stream. The pattern repository 400 stores copies of the patterns based on access time of the patterns. As illustrated in FIG. 4, P1, P2, and P3 are stored in segment 410 of the pattern repository 400. Since segment 410 has been filled up, the next pattern following P3 in the data stream, i.e., P4, is stored in segment 420 immediately following segment 410. Likewise, when segment 420 is filled up with P4 and P5, P6 is stored in the next segment, i.e., segment 430. The pattern immediately following P6 in the data stream is P3. Note that a copy of P3 has been stored in segment 410 already. Thus, in Single Instance Store, the pattern repository 400 would not store another copy of P3 in segment 430. Instead, a pointer is stored on another disk to refer to P3 in segment 410. However, the access time of P3 after accessing P6 in segment 430 is relatively high because P3 is in a different segment than P6. Moreover, P3 is in a segment not immediately prior to or next to the segment that P6 is in, i.e., segment 430.

To solve the above problem, Multiple Instance Store stores an additional copy of P3, designated as P3' in the same segment as P6, i.e., segment 430, and the pointer is reset to refer to the additional copy of P3, i.e., P3', instead of P3. Since P3' is a copy of P3, P3' is a bit stream of "01010000" in the current example. Note that the access time of P3' is shorter than the access time of P3 after accessing P6 because P3' is in the same segment as P6, and hence, P3' would be loaded into a cache buffer or a RAM when the entire segment 430 is loaded for accessing P6. It should be noted that this improvement in access time is obtained at the cost of lower compression efficiency of the data stream, because the pattern repository 400 stores two copies of P3 instead of one copy of P3. Thus, in determining whether to store an additional copy of a pattern, both the access time of the pattern and the desired compression ratio should be considered to provide an optimized result.

Figure 5A:
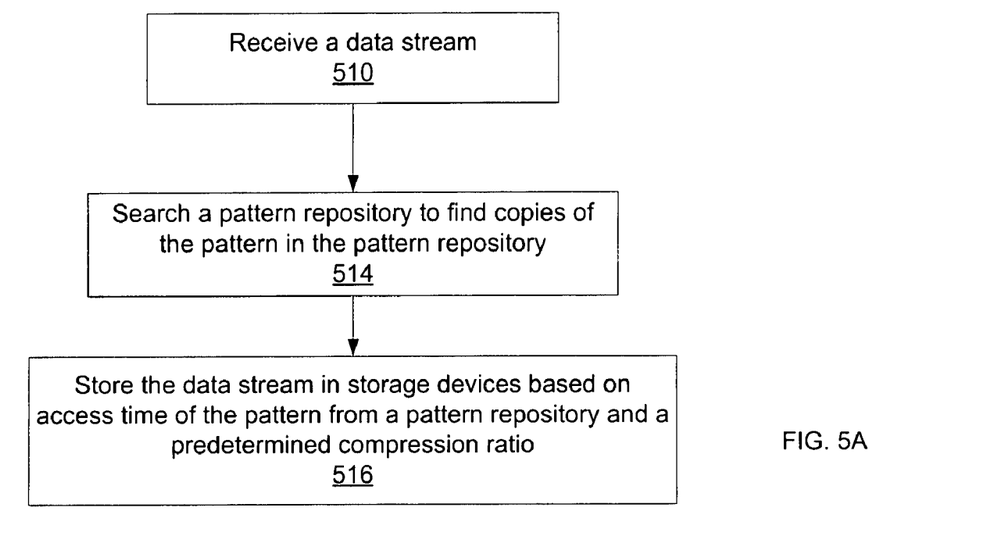
FIGS. 5A-5B illustrate flow diagrams of embodiments of a process to store data.
Figure 5B:
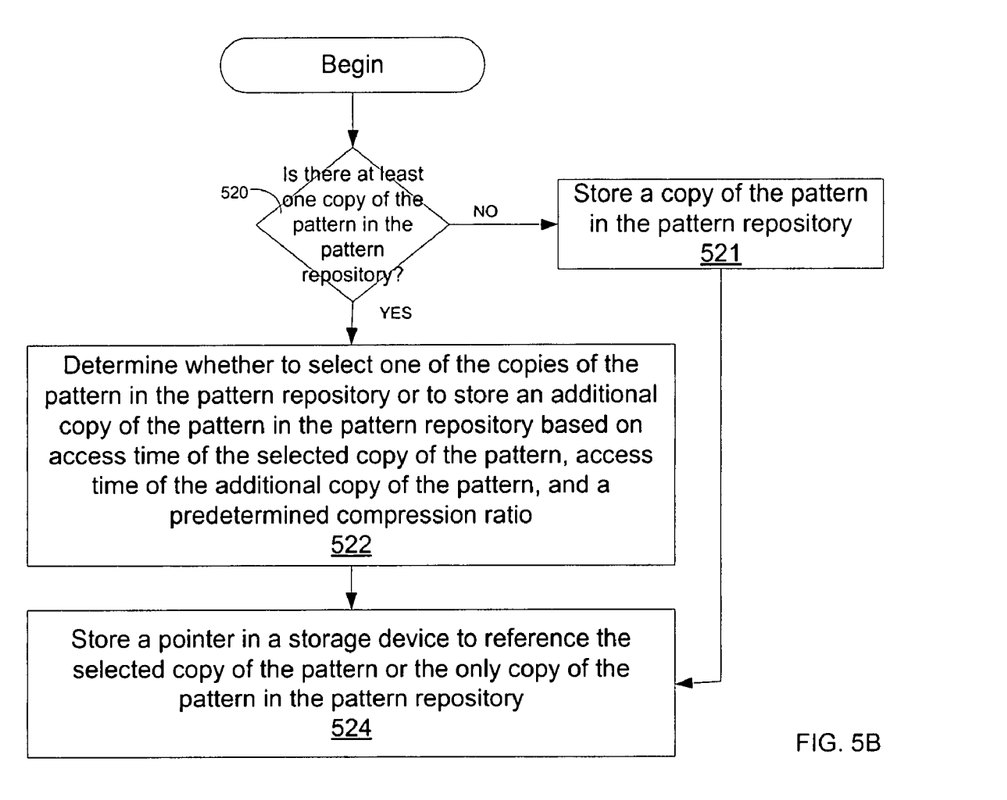

FIGS. 5A-5B illustrate flow diagrams of embodiments of a process to backup data in a networked storage system according to the technique introduced above. The process is performed by processing logic that comprises hardware (e.g., circuitry, dedicated logic, etc.), software (such as is run on a general-purpose computer system or a dedicated machine, such as the VTL appliance 115 in FIG. 1), or a combination of both.

Referring to FIG. 5A, processing logic receives data containing a pattern (processing block 510). In some embodiments, the data stream is sent from a client coupled to a backup storage server running a backup application. The data may contain a number of patterns, many of which repeat themselves in the data stream. Furthermore, the patterns may appear in a random order in the data stream. A copy of some or all of the patterns appearing in the data stream is stored in a pattern repository. In some embodiments, multiple copies of the pattern may be stored in the pattern repository. Processing logic then searches the pattern repository to find one or more copies of the pattern (processing block 514). Processing logic then stores the data stream in storage devices (e.g., disks) based on access time of the copies of the patterns from the pattern repository and a predetermined compression ratio (processing block 516). More details of one embodiment of a process to store the data stream are described below with reference to FIG. 5B.

FIG. 5B illustrates one embodiment of a process to store a portion of data matching a pattern in a pattern repository. Referring to FIG. 5B, processing logic checks if there is at least one copy of the pattern in the pattern repository (processing block 520). If there is none, processing logic stores a copy of the pattern in the pattern repository (processing block 521) and then transitions to processing block 524. Otherwise, processing logic determines whether to select one of the copies of the pattern found or to store an additional copy of the pattern in the pattern repository based on access time of the selected copy of the pattern, access time of the additional copy of the pattern, and a predetermined compression ratio (processing block 522). One example illustrating such determination has been described above with reference to FIG. 4.

Finally, processing logic stores a pointer in a storage device (e.g., a disk) to reference the selected copy of the pattern or the only copy of the pattern in the pattern repository (processing block 524). In one embodiment, the pointers are stored in the same order as the order in which the patterns appear in the data. Thus, the pointers may be accessed sequentially to reconstruct a copy of the data from the patterns stored in the pattern repository.

Figure 5C:
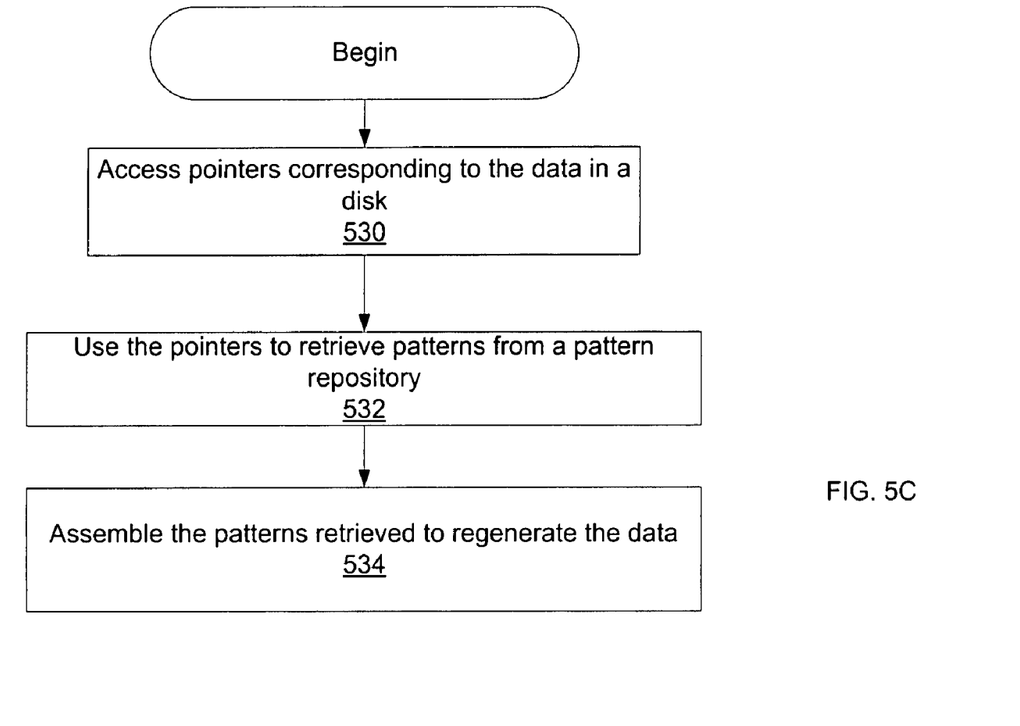
FIG. 5C illustrates one embodiment of a process to retrieve a stored copy of data previously received.

FIG. 5C illustrates one embodiment of a process to retrieve a stored copy of data previously received. The process is performed by processing logic that comprises hardware (e.g., circuitry, dedicated logic, etc.), software (such as is run on a general-purpose computer system or a dedicated machine, such as the VTL appliance 115 in FIG. 1), or a combination of both.

Processing logic accesses pointers corresponding to the data stream in a storage device, such as a disk (processing block 530). The pointers refer to patterns in a pattern repository. The patterns may appear in the data stream in the same order as the order in which the pointers are stored in the storage device. Thus, processing logic may access the pointers sequentially to preserve the order in which these pointers have been stored. Processing logic then uses the pointers to retrieve the corresponding patterns from the pattern repository (processing block 532) in order. Processing logic may retrieve all patterns in a segment of the pattern repository at a time and put the retrieved patterns in a cache buffer (e.g., the cache buffer 320 in FIG. 3). When processing logic is done retrieving the patterns in the segment, processing logic may retrieve patterns referenced by the pointers in another segment and put those patterns into the cache buffer. Processing logic assembles the retrieved patterns to regenerate the data (processing block 534). For example, processing logic may concatenate the patterns in the same order as their corresponding referencing pointers to regenerate the data stream.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method, comprising:
    receiving a first data stream from one or more clients, wherein the first data stream comprises one or more data patterns referenced by one or more pointers stored in one or more storage devices;
    receiving a second data stream from the one or more clients;
    checking if a copy of a particular data pattern of the second data stream is already stored in a pattern repository;
    in response to the copy of the particular data pattern already stored in the pattern repository, storing a new pointer in the one or more storage devices to reference the copy of the particular data pattern already stored in the pattern repository based on an access time of the copy of the particular data pattern in the pattern repository being less than a predetermined access time;
    in response to the copy of the particular data pattern already stored in the pattern repository, storing a new copy of the particular data pattern in the pattern repository and storing the new pointer in the one or more storage devices to reference the new copy of the particular data pattern based on the access time of the copy of the particular data pattern in the pattern repository being greater than the predetermined access time; and
    in response to the copy of the particular data pattern not already stored in the pattern repository, storing the new copy of the particular data pattern in the pattern repository and storing the new pointer in the one or more storage devices to reference the new copy of the particular data pattern.

2. The method of claim 1, wherein the access time is evaluated in terms of a locality of the particular data pattern.

3. The method of claim 1, wherein the pattern repository is a single instance store.

4. The method of claim 1, wherein the access time is based on weighing a storage efficiency benefit of accessing the particular data pattern against a compression ratio.

5. The method of claim 1, further comprising:
    dividing the pattern repository into multiple segments;
    reading one or more of the multiple segments into a cache buffer; and accessing one or more of the multiple segments from the cache buffer.

6. The method of claim 4, wherein the compression ratio is a compression efficiency.

7. The method of claim 1, further comprising:
designating a number of segments of the pattern repository as redundant segments; and
replacing a failed media segment with a redundant segment.

8. The method of claim 1, further comprising:
resetting one or more pointers stored in the storage device to reference a different data pattern copy stored in the pattern repository.

9. A system, comprising:
one or more storage devices;
a pattern repository;
a processing logic configured to receive a first data stream from one or more clients, wherein the first data stream comprises one or more data patterns referenced by one or more pointers stored in one or more storage devices;
the processing logic further configured to receive a second data stream from one or more clients;
the processing logic further configured to check if a copy of the particular data pattern of the second data stream is already stored in a pattern repository;
the processing logic further configured to store, in response to the copy of the particular data pattern already stored in the pattern repository, a new pointer in the one or more storage devices to reference the copy of the particular data pattern already stored in the pattern repository based on an access time of the copy of the particular data pattern in the pattern repository being less than a predetermined access time;
the processing logic further configured to store, in response to the copy of the particular data pattern already stored in the pattern repository, a new copy of the particular data pattern in the pattern repository and store the new pointer in the one or more storage devices to reference the new copy of the particular data pattern based on the access time of the copy of the particular data pattern in the pattern repository being greater than the predetermined access time; and
the processing logic further configured to store, in response to the copy of the particular data pattern not already stored in the pattern repository, the new copy of the particular data pattern in the pattern repository and store the new pointer in the one or more storage devices to reference the new copy of the particular data pattern.

10. The system of claim 9, wherein the access time is evaluated in terms of a locality of the particular data pattern.

11. The system of claim 9, wherein the pattern repository is a single instance store.

12. The system of claim 9, wherein the access time is based on weighing a storage efficiency benefit of accessing the particular data pattern against a compression ratio.

13. The system of claim 9, further comprising:
multiple segments divided into the pattern repository; and
a module configured to read one or more of the multiple segments into a cache buffer and further configured to access one or more of the multiple segments from the cache buffer.

14. The system of claim 12, wherein the compression ratio is based on a compression efficiency.

15. The system of claim 9, further comprising:
a raid module configured to designate a number of segments of the pattern repository as redundant segments and further configured to replace a failed media segment with a redundant segment.

16. The system of claim 9, wherein the system is configured to reset one or more pointers stored in the one or more storage devices to reference a different data pattern copy stored in the pattern repository.

17. A computer readable storage medium storage containing executable program instructions executed by a processor, comprising:
program instructions that receive a first data stream from one or more clients, wherein the first data stream comprises one or more data patterns referenced by one or more pointers stored in one or more storage devices;
program instructions that receive a second data stream from the one or more clients;
program instructions that check if a copy of a particular data pattern of the second data stream is already stored in a pattern repository;
program instructions that store, in response to the copy of the particular data pattern already stored in the pattern repository, a new pointer in the one or more storage devices to reference the copy of the particular data pattern already stored in the pattern repository based on an access time of the copy of the particular data pattern in the pattern repository being less than a predetermined access time;
program instructions that store, in response to the copy of the particular data pattern already stored in the pattern repository, a new copy of the particular data pattern in the pattern repository and store the new pointer in the one or more storage devices to reference the new copy of the particular data pattern based on the access time of the copy of the particular data pattern in the pattern repository being greater than a predetermined access time; and
program instructions that store the new copy of the particular data pattern in the pattern repository and store the new pointer in the one or more storage devices to reference the new copy of the particular data pattern, in response to the copy of the particular data pattern not already stored in the pattern repository.

* * * * *

UNITED STATES PATENT AND TRADEMARK OFFICE
CERTIFICATE OF CORRECTION

PATENT NO. : 7,853,750 B2  
APPLICATION NO. : 11/700701  
DATED : December 14, 2010  
INVENTOR(S) : Stager Page 1 of 1

It is certified that error appears in the above-identified patent and that said Letters Patent is hereby corrected as shown below:

Correct as follows:

In Col. 11, line 24:
~~the~~ a particular data pattern of the second data stream is In Col. 11, line 25:
already stored in ~~a~~ the pattern repository In Col. 12, line 19:
17. A computer readable storage medium ~~storage~~ contain- Signed and Sealed this
Thirty-first Day of January, 2012

David J. Kappos
*Director of the United States Patent and Trademark Office*